(12) United States Patent
Auer

(10) Patent No.: US 6,244,411 B1
(45) Date of Patent: Jun. 12, 2001

(54) POLYMER SLEEVE SNAP RING GROOVE REINFORCEMENT

(75) Inventor: Charles Michael Auer, Troy, MI (US)

(73) Assignee: ZF Meritor, LLC, Laurinburg, NC (US)

( * ) Notice: Subject to any disclaimer, the term of this patent is extended or adjusted under 35 U.S.C. 154(b) by 0 days.

(21) Appl. No.: 09/399,241

(22) Filed: Sep. 20, 1999

(51) Int. Cl.⁷ .............................. F16D 23/14; F16C 33/20
(52) U.S. Cl. ................. 192/98; 384/29; 384/299
(58) Field of Search .................... 192/98, 89.24, 192/70.3, 110 B; 384/26, 29, 42, 908, 909, 275, 299

(56) References Cited

U.S. PATENT DOCUMENTS

| | | | |
|---|---|---|---|
| 2,622,949 | * 12/1952 | Cotchett | 384/299 |
| 4,034,836 | 7/1977 | Sink et al. | |
| 4,117,916 | * 10/1978 | Baker | 192/98 |
| 4,815,867 | * 3/1989 | Ladin | 192/110 B X |
| 4,890,708 | 1/1990 | Kitano et al. | |
| 5,080,334 | * 1/1992 | Mihara et al. | 384/42 X |
| 5,318,162 | * 6/1994 | Maucher et al. | 192/89.24 X |
| 5,416,154 | * 5/1995 | Ferdani | 384/908 |
| 5,443,143 | * 8/1995 | Tobiasz | 192/98 X |
| 5,547,058 | * 8/1996 | Parzefall et al. | 192/98 X |
| 5,974,667 | * 11/1999 | Bryson | 384/42 X |
| 6,029,790 | * 2/2000 | Liu et al. | 192/98 |

* cited by examiner

Primary Examiner—Rodney H. Bonck
(74) Attorney, Agent, or Firm—Carlson, Gaskey & Olds

(57) ABSTRACT

A clutch sleeve assembly for an automotive clutch system includes a polymer sleeve having a snap ring groove and a metal bushing disposed within the polymer sleeve having a flange that acts as a reinforcement for the snap ring groove. There are two configurations of the snap ring groove on the polymer sleeve. In the first configuration, the polymer sleeve has a notch around an outer circumference along its edge adjacent the bushing flange. In this configuration, the bushing flange extends beyond the polymer sleeve edge to form a snap ring groove in conjunction with the notch. In the second configuration, the polymer sleeve has a snap ring groove around its outer circumference spaced apart from its edge that is adjacent the bushing flange.

20 Claims, 2 Drawing Sheets

POLYMER SLEEVE SNAP RING GROOVE REINFORCEMENT

BACKGROUND OF THE INVENTION

This invention generally relates to a clutch sleeve assembly and more particularly to a reinforced polymer clutch sleeve assembly.

Clutch systems are used in vehicles to facilitate changing the transmission gears. Depressing a clutch pedal within a vehicle forces a series of components to interact with each other, thus causing disengagement of the clutch from the engine. When the clutch is disengaged from the engine, transmission gears can be changed. One integral component of the clutch system is a clutch sleeve assembly.

Typically, the clutch system includes pairs of facing plates or clutch discs. One set of plates is driven by the engine and the other set drives the transmission when the two sets of plates are in contact. A clutch cover assembly is movable to selectively squeeze the two sets into engagement. An actuator such as a clutch pedal linkage or hydraulic/electronic control moves a linkage to control the squeezing of the discs.

A clutch sleeve assembly is the component that facilitates disengagement of the transmission and engine by stopping the clamping action of the clutch cover assembly. Each clutch sleeve assembly includes a sleeve and a bushing disposed within the sleeve. The sleeve assembly needs to be extremely durable due to the excessive tensile forces it encounters. Historically, clutch sleeve assemblies, including the sleeve and the bushing, are made entirely of metal. However, there are disadvantages to using metal clutch sleeve assemblies including, but not limited to, the cost and weight of metal.

More recently it has been proposed to use composite materials with a metal liner to form the release sleeve. However, it would be desirable to increase the strength of these assemblies.

SUMMARY OF THE INVENTION

The clutch sleeve assembly of the present invention is less expensive to manufacture and is lighter than the prior art. In general terms, the disclosed clutch sleeve assembly includes a composite sleeve and a metal bushing having a flange disposed within the composite sleeve. The bushing flange extends over an edge of the composite sleeve. The composite sleeve preferably has a snap ring groove around its outer circumference. There are preferably two snap ring groove placement configurations.

In a preferred embodiment, the snap ring groove is a notch positioned around the outer circumference of the composite sleeve at its edge adjacent the bushing flange. In this configuration, the flange extends beyond the composite sleeve notch. Therefore, the flange and the notch together form a snap ring groove.

In either embodiment, the bushing flange reinforces the composite sleeve, and increases its strength and ability to transmit force.

In an alternative embodiment, the snap ring groove is spaced apart from the edge adjacent the bushing flange. In this configuration, the flange reinforces the end of the composite sleeve near the snap ring groove.

These and other features of the invention may be best understood from the following specification and drawings. The following is a brief description of the drawings.

DETAILED DESCRIPTION OF THE PREFERRED EMBODIMENT

Figure 1:
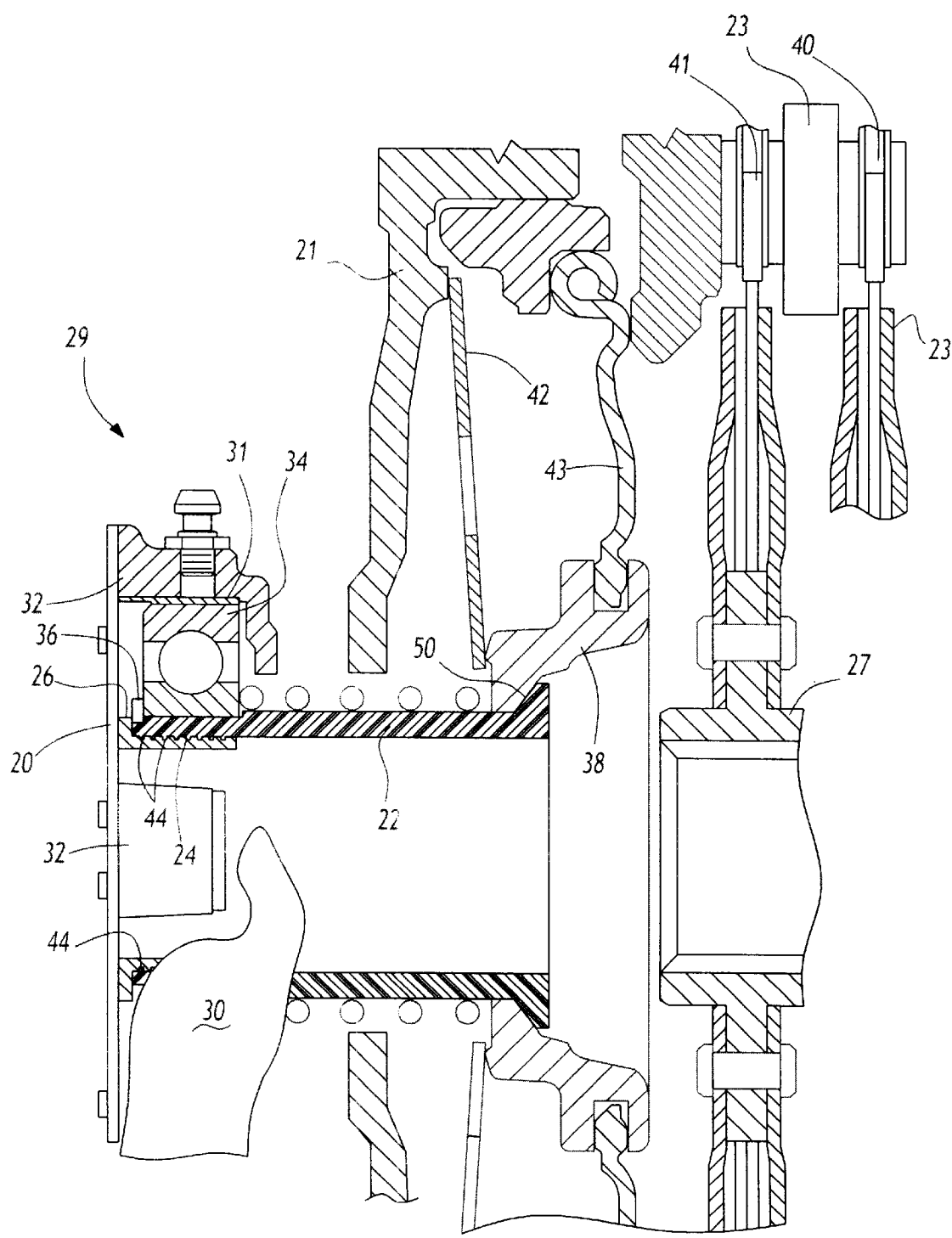
FIG. 1 is a schematic illustration of a system designed according to this invention.

FIG. 1 schematically illustrates a vehicle clutch assembly having a composite sleeve assembly with a snap ring groove reinforcement, generally shown at 20, positioned in a heavy vehicle clutch system. The sleeve assembly 20 preferably includes a reinforced polymer sleeve 22. Further, the sleeve assembly 20 includes a metal reinforcement, preferably a bushing 24 having a flange 26 disposed within the polymer sleeve 22.

A clutch "kit" is comprised of a clutch cover assembly 21, two disc assemblies 40, 41, and a center plate 23. In addition to providing vibration dampening protection to the vehicle drive-train, the purpose of the clutch is to function as an "on/off" switch in controlling the transmission of engine torque to the vehicle transmission/drive-train.

The clutch cover assembly 21 is affixed to the rotating engine flywheel 25. While in the engaged position, the clutch cover assembly 21 clamps the discs 40, 41 and center plate 23 against the flywheel 25, causing them to rotate in concert with the flywheel 25. The clamping characteristic is created by forcing internal springs 42 into a compressed state and applying a clamping force to a lever 43, which in turn generates a reactionary force on the components that "cage" the springs 42.

With splined centers, the disc assemblies 40, 41 mesh with the transmission input shaft 27, causing it to also rotate along with the engine flywheel 25 and to apply engine torque to the vehicle transmission. In this way the clutch acts as a "torque on" switch. In it's disengaged state, the discs 40, 41 are no longer clamped to the flywheel 25, and the input shaft 27 is no longer forced to rotate at engine speed; this is analogous to the clutch acting as a "torque off" switch. The default state of a clutch is the engaged position.

Clutches are designed such that their state can be changed (disengaged) via a mechanical interface with the "stationary" portion of the vehicle system (i.e. foot pedal and linkage) while the main body of the clutch rotates at engine speed. The state change is initiated via linear displacement of the bearing assembly, shown generally at 29, along the axis of rotation, while overcoming (and further compressing) the internal springs 42 which generated the clamping force of the clutch. During this displacement, the sleeve 22, which connects the bearing assembly 29 to the main body of the clutch, is subject to tensile stresses. It is at this time that the material surrounding the snap ring groove must withstand these forces.

The vehicle's clutch release system preferably includes a clutch pedal, or alternatively a hydraulic/electronic controller, connected to a release fork 30 through a linkage, a bearing housing 32, a bearing 34 within the bearing housing 32 connected to the polymer sleeve 22, and a snap ring 36 positioned around the polymer sleeve 22 and adjacent the bearing 34. The clutch sleeve 22 causes the retainer 38 to be moved against the compressive state of the diaphragm spring 42, eliminating the clamp force that had been applied to the lever 43 (by the retainer 38) and releasing the disc assemblies 40, 41.

Preferably, the clutch pedal is depressed from inside the vehicle to disengage the sets of discs 40, 41 from each other, which allows the transmission gears to be changed. Depressing the clutch pedal forces the release fork 30 to pivot and actuate the bearing housing 32. Alternatively, in an electronically or automatically controlled clutch, an electronic controller signals to the release fork 30 to pivot and actuate the bearing housing 32. Actuation of the bearing housing 32 forces the housing 32, bearing 34 and sleeve 22 to move. This allows the disks 40, 41 to move out of engagement. The above paragraphs are intended as a general description of clutch operation and all the information is standard and known.

The bearing housing 32 contains a bearing 34 that is press fit on the sleeve 22 and held in the housing 32 with a leaf spring 31. Preferably, the bearing 34 is cylindrically shaped having a central bore press fit to and surrounding the polymer sleeve 22. A snap ring 36 also snaps into place to surround the polymer sleeve 22 adjacent the bearing 34 at the end furthest away from the disks 40, 41. The snap ring 36 prevents the bearing 34 from sliding off the polymer sleeve 22 when the bearing housing 32 is forced away from the disks 40, 41.

Figure 2:
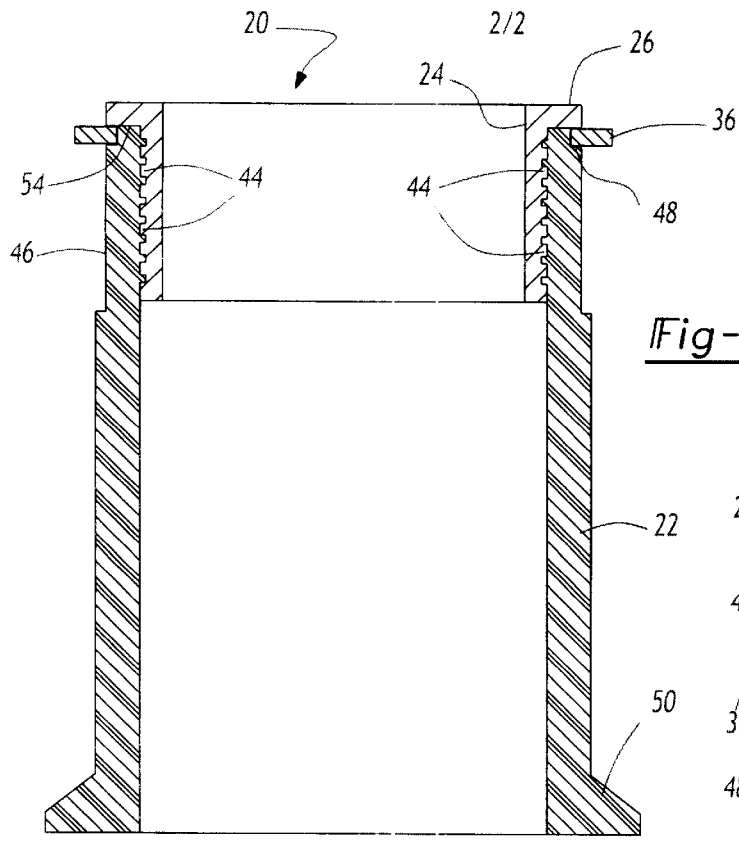
FIG. 2 is a cross-sectional view of the clutch sleeve assembly.
Figure 3:
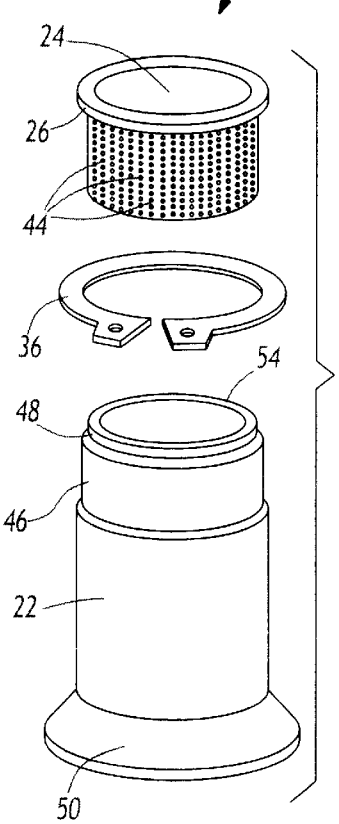
FIG. 3 is an exploded perspective view of the clutch sleeve assembly.

As shown in FIGS. 2 and 3, the polymer sleeve 22 and the metal bushing 24 may be integrally molded together. If this feature is used, the bushing 24 preferably has holes 44 through its cylindrical walls. The polymer sleeve 22 is molded around the bushing 24. During the molding process, polymer material fills the holes 44 in the bushing 24 causing the polymer sleeve 22 and the bushing 24 to become integrally bonded.

The polymer sleeve 22 preferably has two grooves 46, 48 around its outer circumference and a spherical flange 50 around its opposite end. The first, wider groove 46 receives the bearing 34. The second, narrower groove 48 receives the snap ring 36. The polymer sleeve flange 50 facilitates engagement between the polymer sleeve 22 and the retainer 38.

In the preferred embodiment, the snap ring groove 48 is preferably formed from a notch positioned around the sleeve's 22 outer circumference along its edge 54 adjacent the metal bushing flange 26. The flange 26 extends beyond the polymer sleeve edge 54 the same distance as the bearing's 34 internal diameter. Therefore, the snap ring groove 48 in the polymer sleeve 22 is formed from the bushing flange 26 and the polymer sleeve notch 48.

Figure 4:
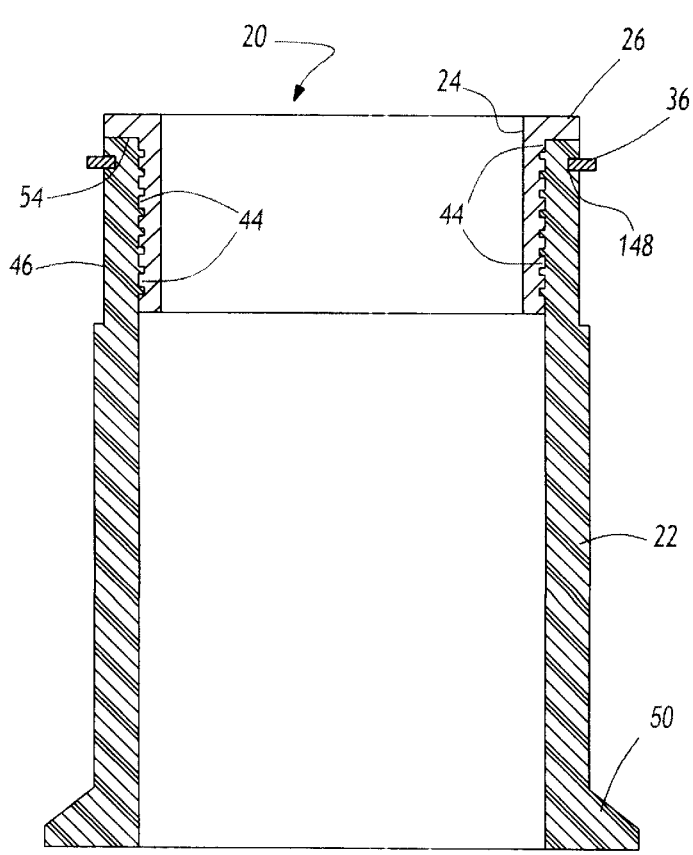
FIG. 4 is an alternative embodiment of the system of FIG. 2.

In an alternative embodiment, as shown in FIG. 4, the polymer sleeve 22 has a snap ring groove 148 around its outer circumference spaced apart from the polymer sleeve edge 54 adjacent the bushing flange 26. The bushing flange 26 reinforces the polymer sleeve 22 in the area of the snap ring groove.

The bushing flange 26 is important to the design of this invention because it acts as a reinforcement for the polymer sleeve 22. In both the preferred and alternative embodiments, the edge of the plastic sleeve 22 is preferably reinforced near the snap ring groove 48, 148 due to the forces encountered by the sleeve 22. The force exerted on the clutch pedal is transmitted through the release fork 30, to the bearing housing 32, to the bearing 34 and to the snap ring 36. The bearing is press fit to the sleeve. The snap ring acts a safety net if slippage occurs. Creep occurs only when the press fit fails. The force encountered by the bearing 34 forces the whole sleeve assembly and all the attached components to move. Therefore, there is a large force exerted on the bearing 34 and ultimately on the snap ring 36 and to a small area of the plastic sleeve. Due to this combination of a large force exerted on a small area of the plastic sleeve around the snap ring, it is preferable to reinforce the sleeve with a stronger material that is able to withstand greater loads. This flange 26 thus makes the use of the plastic sleeve more practical and reliable.

A preferred material for the sleeve is Nylon 66, 50% long glass fiber from Mid American Products, N66G50-02-4.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. An automotive clutch system comprising:
   a plurality of clutch members which serve as friction surfaces selectively moved into and out of engagement;
   a non-metallic sleeve for actuating said members into and out of engagement; and
   a bushing disposed within said non-metallic sleeve, said bushing being formed of a metal and having a flange, wherein said flange extends over and abuts an edge of said non-metallic sleeve.

2. The clutch of claim 1, wherein said non-metallic sleeve is made from a composite.

3. The clutch of claim 2, wherein said composite sleeve is made from a polymer.

4. The clutch of claim 1, wherein said sleeve has a notch around an outer circumference along said edge adjacent said bushing flange, wherein said flange extends beyond said sleeve edge to form a snap ring groove with said notch.

5. The clutch of claim 1, wherein said sleeve has a snap ring groove around an outer circumference spaced apart from said sleeve edge adjacent said bushing flange.

6. An automotive clutch system comprising:
   a plurality of clutch members selectively moved into and out of engagement;
   a clutch sleeve for moving said members into and out of engagement; and
   a bushing having a flange, said bushing being disposed within said clutch sleeve and said flange extending over and abutting an edge of said clutch sleeve.

7. The clutch of claim 6, wherein said clutch sleeve is made from a polymer.

8. The clutch of claim 7, wherein said polymer clutch sleeve has a notch around an outer circumference along said edge adjacent said bushing flange, wherein said flange extends beyond said polymer clutch sleeve edge to form a snap ring groove with said notch.

9. The clutch of claim 7, wherein said polymer clutch sleeve has a snap ring groove around an outer circumference spaced apart from said polymer clutch sleeve edge adjacent said bushing flange.

10. A clutch sleeve assembly, comprising
    a polymer sleeve; and
    a metal reinforcement having a flange, said reinforcement being disposed within said polymer sleeve and said flange extending over and abutting an edge of said polymer sleeve.

11. The clutch sleeve assembly of claim 10, wherein said metal reinforcement is a bushing.

12. The clutch sleeve assembly of claim 11, wherein said polymer sleeve and said bushing are generally cylindrical.

13. The clutch sleeve assembly of claim 12, wherein said bushing has holes, said polymer sleeve is molded around said bushing, wherein polymer material fills said holes in said bushing and said bushing and said polymer sleeve become integrally bonded.

14. The clutch sleeve assembly of claim 12, wherein said polymer sleeve has a notch around an outer circumference at a first end along said edge adjacent said bushing flange, wherein said flange extends beyond said polymer sleeve edge to form a snap ring groove with said notch.

15. The clutch sleeve assembly of claim 12, wherein said polymer sleeve has a snap ring groove around an outer circumference at a first end spaced apart from said polymer sleeve edge adjacent said bushing flange.

16. The clutch sleeve assembly of claim 12, wherein said polymer sleeve has a flange around an outer circumference at a second end.

17. The clutch sleeve assembly of claim 14, wherein said polymer sleeve has a groove around an outer circumference spaced apart from said notch, and said groove is wider than said notch.

18. The clutch sleeve assembly of claim 15, wherein said polymer sleeve has a groove around an outer circumference spaced apart from said notch, and said groove is wider than said notch.

19. An automotive clutch system comprising:

a plurality of clutch members which serve as friction surfaces selectively moved into and out of engagement;

a non-metallic sleeve for actuating said members into and out of engagement, said sleeve having a notch around an outer circumference; and a bushing disposed within said non-metallic sleeve, said bushing being formed of a metal and having a flange, wherein said flange extends over an edge of said non-metallic sleeve, and said flange abuts and extends beyond said sleeve edge to form a snap ring groove with said notch of said sleeve.

20. An automotive clutch system comprising:

a plurality of clutch members which serve as friction surfaces selectively moved into and out of engagement;

a non-metallic sleeve for actuating said members into and out of engagement, said sleeve having a snap ring groove around an outer circumference; and a bushing disposed within said non-metallic sleeve, said bushing being formed of a metal and having a flange, wherein said flange is adjacent to and extends over an edge of said non-metallic sleeve and said snap ring groove is spaced apart from said sleeve edge.

* * * * *